United States Patent [19]
Katva

[11] 3,756,276
[45] Sept. 4, 1973

[54] MIXING VALVE FOR COLD AND HOT WATER

[75] Inventor: Kunto Ilmari Katva, Funen, Denmark

[73] Assignee: Broen Armatur A/S, Funen, Denmark

[22] Filed: Nov. 29, 1971

[21] Appl. No.: 202,910

[30] Foreign Application Priority Data
Nov. 30, 1970 Denmark .......................... 6098/70

[52] U.S. Cl. ............................. 137/597, 137/606
[51] Int. Cl. ............................................ F16k 19/00
[58] Field of Search .............. 137/597, 606, 625.41; 251/32, 38, 45; 4/148

[56] References Cited
UNITED STATES PATENTS

| | | | |
|---|---|---|---|
| 1,551,226 | 8/1925 | Vallier | 4/148 |
| 2,697,447 | 12/1954 | Troy | 251/32 |
| 3,374,957 | 3/1968 | Tyler | 137/606 X |
| 2,091,110 | 8/1937 | Smallen | 137/625.41 X |
| 3,674,048 | 7/1972 | Manoogian | 137/625.41 X |
| 3,652,053 | 3/1972 | Poitras et al. | 251/38 |
| 3,053,277 | 9/1962 | Bahrani | 137/597 |

Primary Examiner—Robert G. Nilson
Attorney—Watson, Cole, Grindle & Watson

[57] ABSTRACT

In a mixing valve for hot and cold water two separate off-on valves are arranged at the downstream side of a device mixing the hot and the cold water, one of the valves controls a duct through which mixed water is supplied to a shower connection and the other valve controls a duct through which mixed water is supplied to a spout for filling a wash basin or a tub.

1 Claim, 4 Drawing Figures

3,756,276

MIXING VALVE FOR COLD AND HOT WATER

BACKGROUND OF THE INVENTION

The present invention relates to a mixing valve for cold and hot water of the kind comprising a valve housing having an inlet for cold water and an inlet for hot water, two manually operated valves and two outlets, viz. one intended to be connected to a shower and one intended to be connected to a wash basin or tub.

The known mixing valves of this kind are provided with a shifting-over member for shifting-over the flow through the valve between the two outlets thereof. The two inlets of the mixing valve are connected with the shifting-over member via the two manually operated valves. This known mixing valve is used in the following way: The shifting-over member is adjusted in order to supply either the shower or the wash basin or tub. After that the valves which control the flows between the inlets and the shifting-over member are operated until an adequate mixing temperature and an adequate outflow rate are achieved.

SUMMARY OF THE INVENTION

According to the present invention it is proposed that two inlets are connected to a mixing device and that the mixing device is connected to each of the outlets via a valve wherein each of the two valves by means of which the mixing device is connected to the two outlets are push-button or pivot-button shiftable between the closed and the open positions. By means of this construction the mixing valve is very easily operated seeing that, when the wash basin or the tub is to be used, it is sufficient to operate one of the valves only and to adjust the temperature by means of the mixing device. If it is requested to open or close the shower the other valve is to be operated and the mixing device is to be adjusted. However, a wash basin will be used several times during the day and by each such use the same mixing temperature is requested and accordingly no adjustment of the mixing device is necessary between subsequent hand washings so that the operation of the mixing valve under such circumstances is limited to the operation of one valve only. Moreover, each time the valve connected to the wash basin outlet is sequentially opened the same flow rate to the wash basin is achieved. By operating the valve connected to the shower also one and the same flow rate is achieved by each such operation. Accordingly, a person who takes a shower needs only adjust the temperature which is easily done during the bath by adjusting the mixing device.

In order to pre-adjust the flow rate to the wash basin and the shower, respectively an adjustable throttle member may be arranged at the upstream or downstream side of each valve, the adjusting of the throttle member being independent on the button of the valve in question. The throttle member may comprise a rotatable cylinder the end surface of which is formed as a part of a cylinder and projects into a knee formed by the outlet from the valve concerned.

DESCRIPTION OF THE PREFERRED EMBODIMENT

Figure 1:
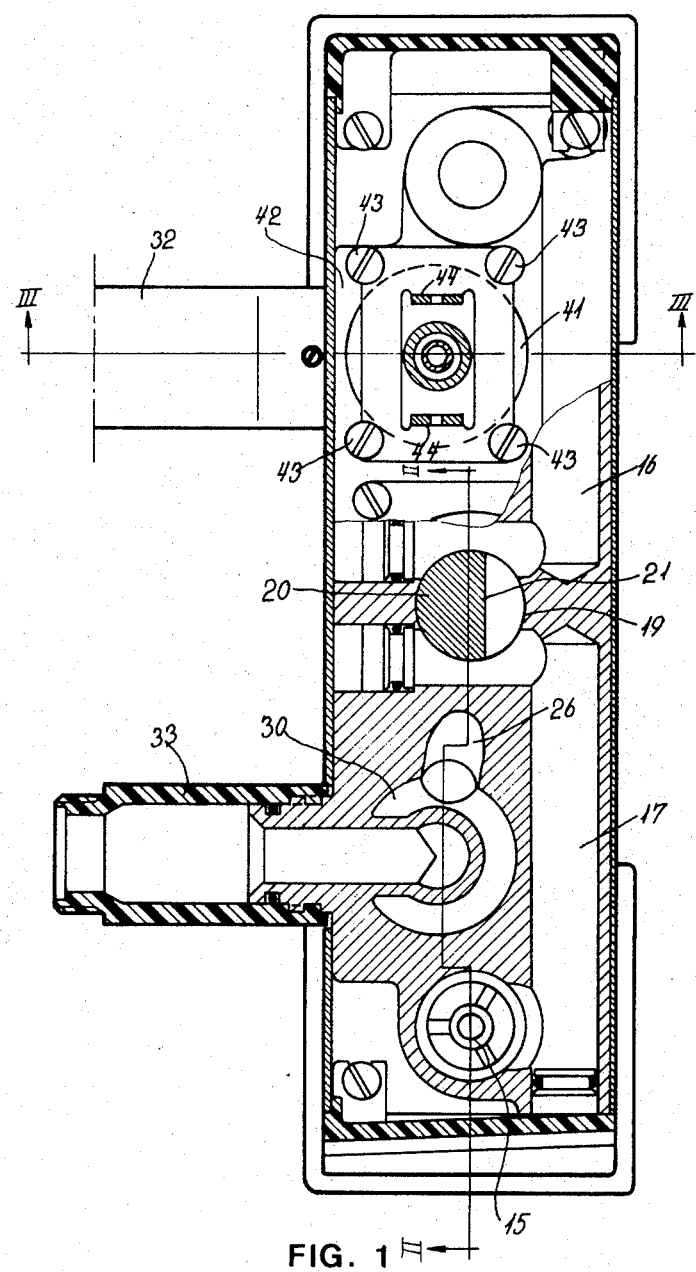
FIG. 1 illustrates a vertical section through a mixing valve according to the invention, FIG. 2 a horizontal section along the line II—II in FIG. 1, FIG. 3 a section along the line III—III in FIG. 1, and FIG. 4 a section along the line IV—IV in FIG. 2.

In the drawing, 1 and 2 indicate connections for connecting the mixing valve to a hot water pipe and a cold water pipe, respectively (not shown). Each connection comprises a connecting piece 3 and 4, respectively arranged eccentrically with respect to a coupling piece 5 and 6, respectively. The coupling pieces 5 and 6 are by means of unions 7 and 8, respectively connected to the housing 9 of the mixing valve. Each of the coupling pieces 5 and 6 contains a cock (not shown) to be used if the mixing valve needs repair and for closing the supply pipes before the mounting of the mixing valve. The eccentric arrangement of the two connecting pieces 3 and 4 allows adaptation to different distances between the supply pipes, viz. by rotation of the two parts 3,5 and 4,6, respectively. A rectangular coolar 10 and 11, respectively is rotatably secured to each of the coupling pieces 5 and 6, respectively, in order to form an appropriate covering against the wall after the mounting of the mixing valve.

Figure 2:
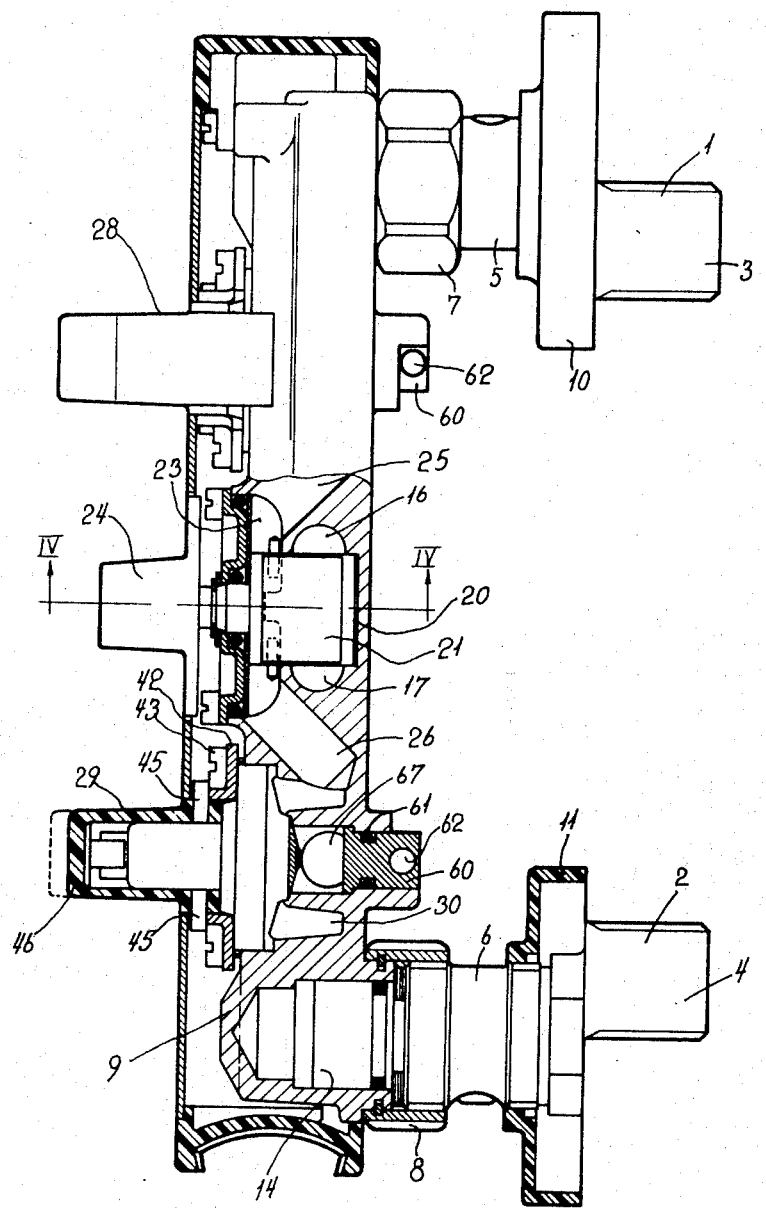
Figure 4:
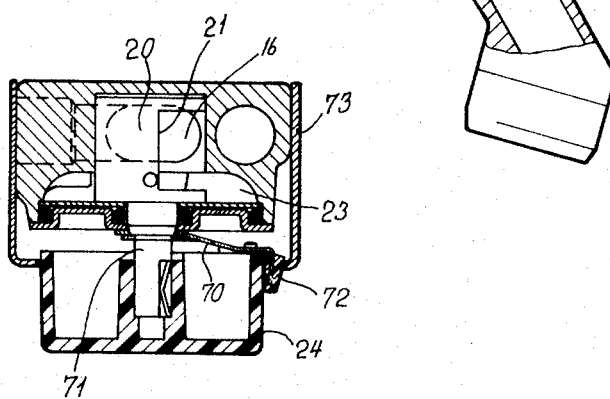

By means of the unions 7 and 8 the two supply pipes may be connected to an inlet of which only one at 14 is illustrated in FIG. 2. In each inlet a non-return valve is inserted. Only one of these non-return valves 15 is shown in FIG. 1. Each of the inlets is connected via these valves with 15 with an inlet duct 16 and 17, respectively. The inlet ducts terminate at each side of a cylindrical bore 19 wherein a mixing slide 20 is rotatably arranged. A lateral recess 21 is provided in the mixing slide 20. The inlet ducts 16 and 17 are connected to the mixing slide at the rear portion thereof as indicated in FIG. 2, whereas the front portion of the mixing slide is surrounded by a mixing chamber 23. Due to the lateral recess 21 in the mixing slide 20 the mixing chamber 23 may be connected with the ends of the two inlet ducts 16 and 17. A handle 24 is secured to the mixing slide so that the mixing slide may be rotated into different angle positions. In FIGS. 2 and 4 th mixing slide 20 is shown in its central position in which the recess 21 defines identical flow areas between the two inlet ducts 16, 17 and the mixing chamber 23. However, if the mixing slide 20 is rotated clockwise in FIG. 2 by means of handle 24, the mixing slide will reduce the flow area between the inlet duct 16 and the mixing chamber 23 and increase the flow area between the inlet duct 17 and the mixing chamber 23.

By means of two connecting ducts 25 and 26 the mixing chamber 23 is connected with the inlet side of two valves 28 and 29, respectively. Each of the two ducts 25 and 26 opens into a U-formed inlet duct to the corresponding valve, cf. 30, FIG. 1. The valve 28 controls the outlet flow to a nozzle 32, FIG. 3, which serves a wash basin or tub whereas the valve 29 controls the outlet flow to a shower connection indicated at 33, FIG. 1.

Figure 3:
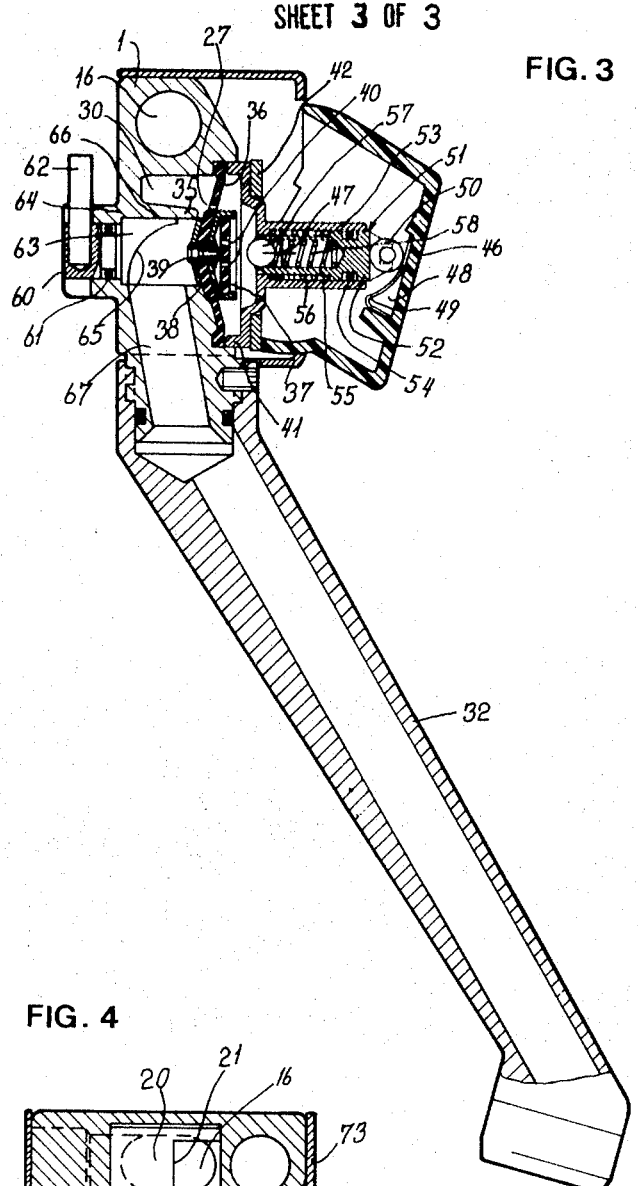

The U-formed inlet duct to each of the valves 28 and 29 partly surrounds a valve seat 35 of the corresponding valve, cf. FIG. 3. Each seat cooperates with a valve body comprising a main diaphragm 36 and an auxiliary diaphragm 37 secured to the main diaphragm by means of a cup formed socket 38 which is secured to the center of the main diaphragm 36 by means of a hollow rivet 39. The auxiliary diaphragm 37 has two holes 40 which are offset with respect to the hole through the rivet 39. A hole 27 is provided in the main diaphragm 36 outside the valve seat 35 in order to provide communication between the inlet duct 30 of the valve concerned and the space over the main diaphragm 36. The margine of the main diaphragm is secured into a recess by means of a shallow cup 41 secured by means of a plate 42 having a central recess corresponding to a depression in the bottom of the cup 41. The plate 42 is secured in the housing by means of four screws 43 as illustrated in FIG. 1. The plate 42 has two ears 44 extending perpendicular to the main portion of the plate 42 and serving as brackets for two pivots 45 by means of which a pivot-button 46 is mounted. The centerline of the two coaxially arranged pivots 45 is illustrated in FIG. 3 by menas of a cross 47. A recess 48 is provided in the inner surface of the button 46 for a spring 49 the surface of which forms a cam for cooperation with a roll 50 at the end of a stem 51. The stem comprises a head 52 which is slidably located in a cylindrical guide 53 extending from the bottom of the cup 41. The stem is sealed with respect to the guide 53 by means of a sealing ring 54. Moreover, the head 52 is constructed with a small tube 55 between which and the guide 53 a pressure spring 56 is arranged. At the end of the small tube 55 a ball 57 is arranged which is biased by means of a pressure spring 58 arranged inside the small tube 55.

The cam surface of the spring 49 is eccentrically arranged with respect to the axis 47 of the pivots 45 and has a curvature such that, in one end position of the button 46 illustrated in FIG. 3, the head 52 is moved as far as possible to the right by menas of the spring 56 and, accordingly, the ball 57 is also moved as far as possible to the right in such a way that the valve may open. If the button 46 is pivoted counterclockwise from the position illustrated in FIG. 3, the cam surface of the spring 49 will press the roll 50 and the ball 57 inwardly. By this movement the ball 57 will press the auxiliary diaphragm 37 against the rivet 39 and close the hole of the rivet and move the main diaphragm towards the seat 35. The outer diameter of the socket 38 is greater than the inner diameter of the seat 35. Accordingly, when the main diaphragm contacts the seat 35, the socket 38 will press the main diaphragm firmly against the seat and will prevent further movement of the central portion of the main diaphragm through the seat. The curvature of the spring 49 is designed in such a manner that the head 52 of the stem during continued movement of the button 46 counterclockwise will be pressed to the left in FIG. 3. During this part of the closing movement of the button, a movement of the central portion of the main diaphragm to the left is prevented by means of the socket 38 as explained above. Accordingly, the ball 57 will be pressed into the small tube 55 against the action of the spring 58 until the button 46 reaches a position, the dead center position, wherein the head 52 has been moved as far as possible to the left in FIG. 3 and wherein the highest portion of the spring 49 contacts th roll 50. By continued movement in the counterclockwise dirction the highest portion of the spring 49 will pass the roll 50 which accordingly will be moved a small distance to the right in FIG. 3 by means of the spring 56 until further movement of the button is stopped by abutment between a top end of the button and the valve housing. During the last part of this movement the ball 57 will be moved a small distance to the left in FIG. 3 with respect to the small tube 55 by means of the spring 58. The valve is now in the closed position which is stable due to the fact that the highest portion of the spring 49 has passed the roll 50.

During the shutting off of the flow area through the valve seat 35 of each of the valves 28 and 29, the pressure prevailing in the corresponding inlet duct 30 will be transmitted through the hole 27 to the right side of the main diaphragm, FIG. 3, and will support the closing movement of the main diaphragm by pressing it against the valve seat 35. Accordingly, the main diaphragm will not close immediately, thereby avoiding any water hammering.

Each of the valves is opendd by pivoting the button thereof to the position illustrated in FIG. 3. FIG. 3 shows the valve 28 in the position which the parts thereof occupy immediately after the button 46 has been pivoted to the opening position. The spring 58 has moved the head 52 and has released the ball 57 from contact with the auxiliary diaphragm 37. Due to the holes 40 in the auxiliary diaphragm the same pressure prevails at both sides thereof, and accordingly the auxiliary diaphragm can immediately, due to the resiliency thereof, occupy the position illustrated in FIG. 3 in which the auxiliary diaphragm has uncovered the hole through the hollow rivet 39. The pressure prevailing at the right side of the main diaphragm will now be released through th holes 40 and the hole through the hollow rivet 39, and accordingly the inlet pressure prevailing at the left side of the main diaphragm along the portion thereof positioned outside the valve side 35 will now lift the main diaphragm. The water may now flow through the seat 35 from the U-formed duct 30.

Co-axially with the seat 35 of each of the valves 28 and 29 a throttle member 31 is rotatably accomodated in the housing 9 of the mixing valve at the back side thereof. Each throttle member comprises a cylindrical shaft 60 which is sealed with respect to the corresponding bore in the housing by means of a sealing ring 61. A pin 62 is secured to the end of the shaft 60 projecting from the housing. The shaft 60 is formed integral with a throttle body 63, the outer surface of which is cylindrical and engages a recess 64 in the housing. The end 65 of the throttle body facing the seat 35 is formed as a quarter of a cylinder and offers maximum flow area at the outlet side of the valve in the position of rotation shown in FIG. 3. However, if the throttle body is rotated 180° by means of the pin 62 from the position shown in FIG. 3, the throttle body 63 will shut off an increasing portion of the outlet area. However, the outlet area cannot be shut off completely because the maximum length of the throttle body, at the side 66 thereof, is too short to completely close the outlet 67 from the corresponding valve.

A panel 73, FIG. 4, embraces the front, upper and lower surfaces of the valve housing 9 in order to conceal the housing itself. The front side of the panel 73 is provided with openings for accommodating the handle 24 and allowing the protrusion of the pivot-buttons 46.

The mixing valve shown and described accordingly operates in such a manner that outflow through the nozzle 32 is achieved by operating the corresponding valve 28, and outflow through the connection 33 to the shower is achieved by operating the valve 29. Mixing rate is adjusted by rotating the mixing slide 20. Moreover, the flow rate from each valve will be constant unless the throttle bodies 63 are adjusted. However, an adjustment of each of the throttle bodies is intended only occasionally e.g. after the mixing valve has been mounted, and the pins 32 to be moved in order to adjust the flow areas of the valves are arranged at the back side of the housing of the mixing valve so as to be hidden from the persons using the mixing valve. However, the throttle bodies 63 allow pre-adjustment so that an adequate flow rate for hand washing and for a shower, respectively may be achieved. Moreover, an adjustment of the mixing temperature between succeeding hand washings usually will be superfluous so that the mixing valve will be very easy to use.

I claim:

1. Mixing valve for cold and hot water, comprising a valve housing, said valve housing having:

two inlets, one for cold water and one for hot water, said inlets being provided adjacent opposite ends of said housing;

two inlet ducts extending from said cold and hot water inlets to a mixing slide provided in said housing at the middle portion thereof;

a mixing chamber connectable with said inlet ducts via said slide;

two ducts extending from said mixing chamber to two valve seats formed in the housing at opposite sides of said mixing chamber, and located between said mixing chamber and said cold and hot water inlets;

an outlet from each of said valve seats, the outlet from one of said valve seats being connectable to a shower and the outlet from the other of said valve seats being connectable to an outlet nozzzle;

said valve housing further comprising two sets of valve members each cooperating with one of said valve seats, each said set being operable by means of a pivot-button shiftable between two positions, viz. one in which the corresponding set of valve members is open and another in which the corresponding set of valve members is closed.

* * * * *